US008870357B2

(12) United States Patent
Kamata et al.

(10) Patent No.: US 8,870,357 B2
(45) Date of Patent: Oct. 28, 2014

(54) MARKING INK FOR COVERED ELECTRICAL CONDUCTOR

(75) Inventors: Takeshi Kamata, Shizuoka (JP); Shigeharu Suzuki, Shizuoka (JP); Keigo Sugimura, Shizuoka (JP); Kiyoshi Yagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1263 days.

(21) Appl. No.: 12/223,321

(22) PCT Filed: Dec. 26, 2006

(86) PCT No.: PCT/JP2006/326353
§ 371 (c)(1), (2), (4) Date: Dec. 8, 2008

(87) PCT Pub. No.: WO2007/086236
PCT Pub. Date: Aug. 2, 2007

(65) Prior Publication Data
US 2009/0182080 A1    Jul. 16, 2009

(30) Foreign Application Priority Data

Jan. 30, 2006  (JP) ................................ 2006-021209

(51) Int. Cl.
*C09D 11/30* (2014.01)
*C09D 11/36* (2014.01)
*C09D 11/107* (2014.01)

(52) U.S. Cl.
CPC ................. *C09D 11/107* (2013.01); *C09D 11/30* (2013.01)
USPC ......... 347/100; 8/445; 8/509; 8/607; 524/361

(58) Field of Classification Search
USPC ............ 252/500–519.1; 347/100; 8/445, 509, 8/607; 524/361
See application file for complete search history.

(56) References Cited

U.S. PATENT DOCUMENTS

| | | | |
|---|---|---|---|
| 5,270,368 A | | 12/1993 | Lent et al. |
| 5,366,760 A | * | 11/1994 | Fujii et al. .................... 427/98.4 |
| 5,693,127 A | * | 12/1997 | Nigam et al. ................. 524/188 |
| 6,048,953 A | * | 4/2000 | Kawashima et al. ....... 526/318.4 |
| 6,110,266 A | * | 8/2000 | Gonzalez-Blanco et al. .......................... 106/31.65 |
| 2002/0086914 A1 | * | 7/2002 | Lee et al. ........................ 522/75 |
| 2003/0158283 A1 | * | 8/2003 | Ylitalo et al. ................... 522/74 |
| 2004/0134380 A1 | * | 7/2004 | Wu ............................ 106/31.36 |
| 2005/0159501 A1 | | 7/2005 | Kiefer-Liptak |
| 2007/0154644 A1 | * | 7/2007 | Hwang et al. .............. 427/383.1 |
| 2007/0166642 A1 | * | 7/2007 | Inoue ......................... 430/270.1 |
| 2008/0192103 A1 | * | 8/2008 | Daems et al. ................ 347/102 |

FOREIGN PATENT DOCUMENTS

| | | | |
|---|---|---|---|
| EP | 0314403 A1 | 5/1989 | |
| EP | 1231243 | 8/2002 | |
| EP | 1321481 | 6/2003 | |
| JP | 06-057188 | 1/1990 | |
| JP | 04-050268 | 2/1992 | |
| JP | 05-163448 | 6/1993 | |
| JP | 2004-134371 | 4/2004 | |
| JP | WO2005116760 | * 12/2005 | ............... G03F 7/00 |
| WO | WO-2004/061871 | 7/2004 | |

OTHER PUBLICATIONS

International Search Report mailed Sep. 14, 2007, issued on PCT/JP2006/326353.
Written Opinion of the International Searching Authority dated Sep. 14, 2007, issued on PCT/JP2006/326353.
European Search Report Appln. No. 06 835 200.4-1217, dated Feb. 23, 2011.

* cited by examiner

*Primary Examiner* — Tri V Nguyen
(74) *Attorney, Agent, or Firm* — Edwards Wildman Palmer LLP; James E. Armstrong, IV

(57) ABSTRACT

The present invention provides a marking ink for a covered electrical conductor utilized for a wire harness of a motor vehicle. The marking ink is printed on the covered conductor formed with polyolefin such as polyethylene and provides a high adherence (coloring), high wear resistance, high productivity, fast drying, and moderate spreading. The marking ink for the covered electrical conductor contains an acrylate resin with molecular weight of 10,500-93,000.

4 Claims, No Drawings

MARKING INK FOR COVERED ELECTRICAL CONDUCTOR

TECHNICAL FIELD

The present invention relates to a marking ink for a covered electrical conductor for identifying a kind and a product date thereof.

RELATED ART

A covered electrical conductor has a wide variety of kinds, such as number, size, and material of the conductor, and kinds of a cover, depending on use thereof. A marking of line or dot is provided on a surface of the cover to classify or organize the covered conductors or distinguish a kind of signal to be transmitted in the conductor.

The marking is distinguished with a space between the markings, a length thereof along a longitudinal direction of the covered conductor, and a color thereof or the combination thereof.

In a conventional method, a roller-type printer is utilized for marking the cover of the electrical conductor by making a roller contact with the cover. A fast and clear marking method is however expected.

WO2004/061871 A1 discloses that an inkjet printer is adapted for marking the covered electrical conductor and for achieving a fast and clear performance compared to the conventional method.

The inkjet printer however can not make use of a conventional ink utilized for the roller-type printer so that a new marking ink for the inkjet printer is expected.

DISCLOSURE OF THE INVENTION

A marking ink for a covered electrical conductor is printed on a cover formed with an ecological or halogen-free material, which does not generate dioxin when burned, such as polyolefin, polypropylene and polyethylene. It is desirable that the covered conductor marked with the ink is utilized for a wire harness of a motor vehicle.

The covered conductor of the wire harness of the motor vehicle requires not only a marking performance such as a good productivity, a fast drying, a good spreading, which is required for the general covered conductor, but also a high adherence and a high wear resistance of a printed portion. The wear resistance is required for the reason that the adjacent covers of a bundle of the covered conductors rub each other and cause friction with other parts when the wire harness is assembled and arranged.

An object of the present invention is to provide a marking ink for the covered electrical conductor utilized for the wire harness. The marking ink has a high adherence, high wear resistance, good productivity, fast drying, and moderate spreading for the cover formed with polyolefin, polypropylene, and polyethylene.

A marking ink for a covered electrical conductor contains an acrylate resin with a molecular weight of 10,500-93,000.

Preferably, the acrylate resin has the molecular weight of 30,000-40,000.

BEST MODE FOR CARRYING OUT THE INVENTION

A marking ink for a covered electrical conductor contains an acrylate resin, a solvent, and a coloring material.

A ketone such as acetone and methyl ethyl ketone is suitable for the solvent of the acrylate resin about solubility, volatility, and handling. The ketone may contain a volatile solvent such as methanol and ethanol.

The coloring material contains a pigment, dye, or intermediate material thereof generally utilized for an inkjet ink. A content of the coloring material of the marking ink is determined from a condition giving a clear marking on a cover of the electrical conductor with an inkjet printing.

It is necessary that the pigment is to be uniformly dispersed in the solvent of the acrylate resin and not to clog a nozzle. The dye contains an yellow, red, blue, and black color components. The yellow color component is oil yellow 129 (C.I. solvent yellow 29) and oil yellow 3G (C.I. solvent yellow 16). The red color component is oil red 513 (C.I. solvent red 27) and oil red RR (C.I. solvent red 24). The blue color component is oil blue 2N (C.I. solvent blue 35) and fast blue 1605 (C.I. solvent blue 38). The black color component is oil black HBB (C.I. solvent black 8) and oil black BS (C.I. solvent black 7). These dyes are available from Orient Chemical Industries Ltd. or other manufacturers.

When a color of the cover is a deep color, the pigment or the intermediate material between the pigment and the dye is utilized. When the color thereof is white or light-colored, the dye is utilized.

The marking ink of the present invention contains polymethyl methacrylate, or polymethyl acrylate (also a modification thereof) as the acrylate resin, or may contain at least two acrylate resins.

The acrylate resin of the marking ink may contain a gum as a softener to enhance toughness of the marking. The acrylate resin containing the gum is available from Asahi Kasei Corporation.

The acrylate resin of the present invention has a mean molecular weight of 10,500-93,000 measured with GPC method. The molecular weight described below also denotes the mean molecular weight. The acrylate resin of molecular weight of less than 10,500 has less wear resistance and a poor endurance. The acrylate resin of molecular weight of more than 93,000 has a lower adherence to the polyolefin cover and the poor endurance. The molecular weight is preferably in the range of 30,000-40,000.

The marking ink may contain a dispersing agent to improve dispersion of the pigment and the like, and a viscosity modifier to adjust the viscosity.

Raw materials of the marking ink are stirred and mixed for homogenizing, and solved and dispersed. The viscosity is then adjusted to eject a droplet of 10-100 nL with an inkjet nozzle of 0.03-0.1 mm in diameter. The adjusted viscosity is 0.1-2 mPa·s and preferably 0.5-1.4 mPa·s. A content of the coloring material is determined from the amount to provide an enough visibility.

A thermal inkjet method, a piezo method, or other general methods can be utilized for the inkjet method in the present invention. A distance between the nozzle and a printing surface depends on the method utilized.

The marking ink of the present invention can be printed on any cover of the electrical conductor. The marking ink can be printed on the conventional electrical conductor covered with polyvinyl chloride, and an ecological or halogen-free electrical conductor covered with polyolefin such as polypropylene and polyethylene which do not generate dioxin when burned.

EXAMPLE

An embodiment of a marking ink of the present invention is described in detail.

Preparation of an Ink Composition:

TABLES 1-3 show manufacturers, types, materials, molecular weight (mean molecular value determined with GPC) of the acrylate resins utilized. TABLES 1-3 also show the solvents (acetone or methyl ethyl ketone (MEK)) and amounts of the materials and coloring materials.

TABLE 1

| | acrylate resin | | | | coloring material | | viscosity | evalauted result | | |
|---|---|---|---|---|---|---|---|---|---|---|
| manufacturer | type | material | mol. wt. (×10³) | conc. (wt %) | (wt %) | solvent | (mPa · s) | (e) | (c) | (t) |
| MITSUBISHI RAYON | BR52 | acrylate resin | 85 | 7.5 | 2.5 | acetone | 1.11 | ◎ | △ | △ |
| MITSUBISHI RAYON | BR73 | acrylate resin | 85 | 7.5 | 2.5 | acetone | 0.67 | ◎ | △ | △ |
| MITSUBISHI RAYON | BR80 | acrylate resin | 95 | 7.5 | 2.5 | acetone | 2.32 | △ | △ | △ |
| MITSUBISHI RAYON | BR83 | acrylate resin | 40 | 5 | 2.5 | acetone | 0.9 | ◎ | ◎ | ○ |
| MITSUBISHI RAYON | BR83 | acrylate resin | 40 | 2.5 | 2.5 | acetone | 0.8 | ◎ | ◎ | ○ |
| MITSUBISHI RAYON | BR85 | acrylate resin | 280 | 3.5 | 2.5 | acetone | 1.40 | ◎ | X | X |
| MITSUBISHI RAYON | BR85 | acrylate resin | 280 | 5 | 2.5 | acetone | 3.48 | X | — | — |
| MITSUBISHI RAYON | BR95 | acrylate resin | 320 | 5 | 2.5 | acetone | 4.66 | X | — | — |
| MITSUBISHI RAYON | BR113 | acrylate resin | 30 | 2.5 | 2.5 | acetone | 0.76 | ◎ | ○ | ○ |
| MITSUBISHI RAYON | BR113 | acrylate resin | 30 | 5 | 2.5 | acetone | 0.88 | ◎ | ◎ | ◎ |
| MITSUBISHI RAYON | BR113 | acrylate resin | 30 | 7.5 | 0.4 | acetone | 1.05 | ◎ | ◎ | ◎ |
| MITSUBISHI RAYON | BR113 | acrylate resin | 30 | 7.5 | 2.5 | acetone | 1.05 | ◎ | ◎ | ◎ | mol. wt.: molecular weight
conc.: concentration
(e): ejectability
(c): coloring
(t): toughness

TABLE 2

| | acrylate resin | | | | coloring material | | viscosity | evalauted result | | |
|---|---|---|---|---|---|---|---|---|---|---|
| manufacturer | type | material | mol. wt. (×10³) | conc. (wt %) | (wt %) | solvent | (mPa · s) | (e) | (c) | (t) |
| MITSUBISHI RAYON | BR113 | acrylate resin | 30 | 7.5 | 4 | acetone | 1.82 | ◎ | ◎ | ◎ |
| MITSUBISHI RAYON | BR113 | acrylate resin | 30 | 10 | 2.5 | acetone | 1.30 | ◎ | ◎ | ○ |
| MITSUBISHI RAYON | BR113 | acrylate resin | 30 | 12.5 | 2.5 | acetone | 1.86 | ○ | ○ | ○ |
| MITSUBISHI RAYON | BR113 | acrylate resin | 30 | 15 | 2.5 | acetone | 2.56 | △ | ○ | ○ |
| MITSUBISHI RATON | BR113 | acrylate resin | 30 | 17.5 | 2.5 | acetone | 3.60 | X | — | — |
| MITSUBISHI RATON | BR113 | acrylate resin | 30 | 20 | 2.5 | acetone | 4.95 | X | — | — |
| MITSUBISHI RAYON | BR113 | acrylate resin | 30 | 5 | 2.5 | MEK | 1.38 | ◎ | ◎ | ◎ |
| MITSUBISHI RAYON | BR113 | acrylate resin | 30 | 7.5 | 2.5 | MEK | 1.05 | ◎ | ◎ | ◎ |
| ASAHI KASEI | 80N | acrylate resin | 93 | 7.5 | 2.5 | MEK | 2.37 | △ | △ | △ |
| ASAHI KASEI | 80N | acrylate resin | 93 | 5 | 2.5 | MEK | 1.38 | ◎ | △ | △ |
| ASAHI KASEI | 80N | acrylate resin | 93 | 3.5 | 2.5 | MEK | 1.02 | ◎ | △ | △ |
| ASAHI KASEI | SR8200 | methacrylate resin + gum | 93 | 5 | 2.5 | acetone | 0.94 | ◎ | △ | △ | mol. wt.: molecular weight
conc.: concentration
(e): ejectability
(c): coloring
(t): toughness

TABLE 3

| manufacturer | acrylate resin type | material | mol. wt. (×10³) | conc. (wt %) | coloring material (wt %) | solvent | viscosity (mPa·s) | evalauted result (e) | (c) | (t) |
|---|---|---|---|---|---|---|---|---|---|---|
| ASAHI KASEI | SR8200 | methacrylate resin + gum | 93 | 6 | 2.5 | acetone | 1.20 | ⊚ | Δ | Δ |
| ASAHI KASEI | SR8200 | methacrylate resin + gum | 93 | 6.5 | 2.5 | acetone | 1.38 | ⊚ | Δ | Δ |
| ASAHI KASEI | SR8200 | methacrylate resin + gum | 93 | 7 | 2.5 | acetone | 1.53 | ○ | Δ | Δ |
| ASAHI KASEI | SR8200 | methacrylate resin + gum | 93 | 7.5 | 2.5 | acetone | 1.81 | ○ | Δ | Δ |
| ASAHI KASEI | SR6200 | methacrylate resin + gum | 10.5 | 5 | 2.5 | acetone | 0.79 | ⊚ | Δ | Δ |
| SOKEN C.E. | MP1000 | acrylate resin | 250-700 | 5 | 2.5 | acetone | 3.25 | X | — | — |
| SOKEN C.E. | MP1600 | acrylate resin | 400-700 | 3 | 2.5 | acetone | 1.80 | ○ | X | X |
| SOKEN C.E. | MP2700M | acrylate resin | 300 | 6 | 2.5 | acetone | 2.35 | Δ | X | X |
| SOKEN C.E. | MP4009 | acrylate resin | 400 | 5 | 2.5 | acetone | 1.64 | ○ | X | X |
| SOKEN C.E. | MP4009 | acrylate resin | 400 | 7.5 | 2.5 | acetone | 3.00 | X | — | — | mol. wt.: molecular weight
conc.: concentration
(e): ejectability
(c): coloring
(t): toughness SRB8200 of Asahi Kasei Corporation in TABLES 2 and 3 contains 5 wt % of the gum with respect to the methacrylate resin.

The molecular weight of MP1000 and MP1600 of Soken Chemical & Engineering Co., Ltd. are not mean molecular weights. MP1000 and MP1600 are mixtures with polyacrylate methyl of molecular weight of 250,000-700,000 and 400,000-700,000, respectively.

The coloring material of the marking ink utilizes oil blue ZN (C.I. solvent blue 35) and fast blue 1605 (C.I. solvent blue 38) of Orient Chemical Industries, LTD.

Viscosity of the Marking Ink (Ejectability):

The ideal viscosity of the marking ink is less than 1.5 mPa·s for inkjet printing. The viscosity of equal or more than 1.5 mPa·s and less than 2 mPa·s is favorite. The viscosity of equal or more than 2 mPa·s and less than 3 mPa·s is still possible for the inkjet printing but the viscosity of equal or more than 3 mPa·s is no longer possible.

The viscosity of the marking ink containing the above compositions is determined with a sine-wave vibro viscometer. The measured ejectability is ⊚ (excellent) for viscosity<1.5 mPa·s, ○ (good) for 1.5 mPa·s≤viscosity<2 mPa·s, Δ (fair) for 2 mPa·s≤viscosity<3 mPa·s, x (poor) for viscosity≥3 mPa·s as given TABLES 1-3. The composition having the ejectability of x (poor) is not carried out for the following evaluation.

Coloring and Wearing Resistance:

The marking inks prepared are printed on the covered electrical conductors.

Each electrical conductor (outer diameter: 1.4 mm, cover color: white) covered with polypropylene is printed with the inkjet printer having a nozzle diameter of 0.065 mm to form a marking of a thickness of about 10 μm in a dried state while moving the electrical conductor in a longitudinal direction.

The coloring properties of the measured results are given in TABLES 1-3 denoted as symbols of ⊚, ○, Δ, x. The ink composition of the symbol ⊚ provides a clear identification of the shape and color of the marking, and the wear resistance for a finger rubbing test. The ink composition of the symbol ○ provides the clear identification of the shape and color of the marking, and the wear resistance for the light finger rubbing test. The strong finger rubbing test peels off the marking but the ink composition can be utilized for the printing ink. The ink composition of the symbol Δ provides the poor identification of the shape and color of the marking, and a poor wear resistance for the light finger rubbing test. The ink composition can be still utilized for the printing ink. The ink composition of the symbol x provides the poor identification of the shape and color of the marking, and the poor wear resistance for the light finger rubbing test.

The ink compositions showing ⊚, ○, Δ for the coloring and wear resistance properties are further evaluated. The evaluated results show that the ink compositions have a fast drying and a moderate spreading. The fast drying provides a fast moving of the electrical conductor in the longitudinal direction compared to the conventional roller-type printer when the marking is carried out at the manufacturing and the moderate spreading provides the clear appearance of the marking.

Toughness:

The wear resistance is also evaluated about the toughness of the marking.

The toughness test is made by setting one covered electrical conductor on a curved board of a curvature of R: 37.5 (15 mm) with the printed marking facing upwardly.

A white felt (No. 2, 80% of sheep wool, 3 mm of thickness: Mitsuhashi felt Co.) is pressed with a prescribed pressure to the covered conductor from above and moved along the covered conductor by a prescribed distance in a reciprocating motion for 30 times.

The measured result of the toughness test is given in TABLES 1-3 denoted as the symbols of ⊚, ○, Δ, x. The ink composition of the symbol ⊚ provides the clear identification of the shape and the excellent toughness, which does not cause any peel-off of the marking, and is adapted to the wire harness of the motor vehicle. The ink composition of the symbol ○ provides the clear identification of the shape and a little peel-off of the marking. The ink composition can be utilized for the wire harness. The ink composition of the symbol Δ provides a few peel-offs and the poor marking shape but can be utilized for the wire harness. The ink composition of the symbol x provides the significant peel-off of the marking and the poor identification of the shape and can not be utilized for the wire harness.

Summary of the Evaluation:

Referring to TABLES 1-3, it is clear that the ink composition suitable for the inkjet contains the acrylate resin with the molecular weight of 10,500-93,000 and provides the excellent coloring and wear resistance for the marking ink of the covered electrical conductor. The ink composition of the molecular weight of 30,000-40,000 provides the more excellent results.

The marking ink of the present invention is printed on a polyethylene cover (outer diameter of 1.4 mm) instead of the polypropylene cover. The good coloring and high toughness of the marking are also achieved.

INDUSTRIAL APPLICABILITY

The marking ink of the present invention provides a high productivity about the marking of the inkjet printing compared to the conventional roller-type printing method. The inkjet printing provides the clear appearance, suitable spreading, excellent coloring and toughness for the marking. The marking ink is thus adapted to not only a general covered electrical conductor but also the wire harness of the motor vehicle under severe circumstances.

The invention claimed is:

1. A marking ink for a covered electrical conductor, the marking ink consisting of a polymethyl(meth)acrylate with a molecular weight of 30,000-40,000, coloring material, and a solvent,
    wherein the solvent is a ketone, and
    wherein an amount of the polymethyl(meth)acrylate is 5 to 10 weight %; an amount of the coloring material is 0.4 to 4 weight %; and an amount of the solvent is 86 to 94.6 weight % with respect to the marking ink.

2. The marking ink as claimed in claim 1, wherein the marking ink has a viscosity of less than 2 mPa·s.

3. The marking ink as claimed in claim 1, wherein the solvent is acetone.

4. The marking ink as claimed in claim 1, wherein the solvent is methyl ethyl ketone.

* * * * *